United States Patent
Bhagwat et al.

(10) Patent No.: US 10,606,922 B2
(45) Date of Patent: Mar. 31, 2020

(54) ANALYZING DOCUMENT CONTENT AND GENERATING AN APPENDIX

(71) Applicant: International Business Machines Corporation, Armonk, NY (US)

(72) Inventors: Anand B. Bhagwat, Pune (IN); Amit P. Bohra, Pune (IN); Krishna Kummamuru, Bangalore (IN); Abhishek Shivkumar, Bangalore (IN)

(73) Assignee: International Business Machines Corporation, Armonk, NY (US)

(*) Notice: Subject to any disclaimer, the term of this patent is extended or adjusted under 35 U.S.C. 154(b) by 0 days.

(21) Appl. No.: 16/193,103

(22) Filed: Nov. 16, 2018

(65) Prior Publication Data

US 2019/0102363 A1 Apr. 4, 2019

Related U.S. Application Data

(63) Continuation of application No. 14/474,353, filed on Sep. 2, 2014, now Pat. No. 10,169,299, which is a continuation of application No. 14/101,739, filed on Dec. 10, 2013, now Pat. No. 9,916,284.

(51) Int. Cl.
```
G06F 17/27      (2006.01)
G06F 17/21      (2006.01)
G06F 16/93      (2019.01)
G06F 16/2458    (2019.01)
G06F 17/22      (2006.01)
```
(52) U.S. Cl.
CPC ........ *G06F 17/211* (2013.01); *G06F 16/2465* (2019.01); *G06F 16/93* (2019.01); *G06F 17/2217* (2013.01); *G06F 17/27* (2013.01); *G06F 17/2745* (2013.01)

(58) Field of Classification Search
CPC .... G06F 17/211; G06F 17/2217; G06F 17/27; G06F 17/2745; G06F 17/30011; G06F 17/30539
USPC ........................................................ 715/249
See application file for complete search history.

(56) References Cited

U.S. PATENT DOCUMENTS

| | | | |
|---|---|---|---|
| 6,167,368 A | 12/2000 | Wacholder | |
| 6,167,370 A | 12/2000 | Tsourikov et al. | |
| 6,424,362 B1 | 7/2002 | Bornstein et al. | |

(Continued)

FOREIGN PATENT DOCUMENTS

EP    1783632 A1    5/2007

OTHER PUBLICATIONS

Bohne et al, "Efficient Keyword Extraction for Meaningful Document Perception", Doc Eng '11; Sep. 2011.

(Continued)

*Primary Examiner* — Stephen S Hong
*Assistant Examiner* — Broderick C Anderson
(74) *Attorney, Agent, or Firm* — Michael O'Keefe

(57) ABSTRACT

A method for generating an appendix from document content is provided. Included is analyzing a structure of a document to identify at least one logical element in a content of a page of the document; identifying at least one relation within the identified at least one logical element to determine an appendix topic; determining a degree of relevance of the at least one relation identifying the appendix topic; extracting an appendix content from at least one source document, based on determining a relevance of the source document to the appendix topic; and formatting the appendix based on the extracted appendix content.

10 Claims, 3 Drawing Sheets

(56) References Cited

U.S. PATENT DOCUMENTS

| | | |
|---|---|---|
| 7,127,473 B2 | 10/2006 | Agassi et al. |
| 8,060,506 B1 | 11/2011 | Chang et al. |
| 8,442,331 B2 | 5/2013 | King et al. |
| 2002/0116170 A1 | 8/2002 | Corman et al. |
| 2003/0042319 A1 | 3/2003 | Moore |
| 2005/0091203 A1 | 4/2005 | Liu et al. |
| 2007/0088609 A1 | 4/2007 | Reller et al. |
| 2007/0174255 A1 | 7/2007 | Sravanapudi et al. |
| 2007/0283267 A1 | 12/2007 | Jeffrey et al. |
| 2008/0275694 A1 | 11/2008 | Varone |
| 2009/0171750 A1 | 7/2009 | Zhou et al. |
| 2011/0043652 A1 | 2/2011 | King et al. |
| 2011/0191276 A1 | 8/2011 | Cafarella et al. |
| 2012/0240025 A1 | 9/2012 | Migos et al. |
| 2015/0161090 A1 | 6/2015 | Bhagwat et al. |
| 2015/0161117 A1 | 6/2015 | Bhagwat et al. |

OTHER PUBLICATIONS

Cai et al., "Text Categorization by Boosting Automatically Extracted Concepts", SIGIR 2003, http://doi.acm.org, SIGR'03 Jul. 28-Aug. 1, 2003, Toronto, Canada.

Gildea et al., "Automatic Labeling of Semantic Roles", Journal of Computational Linguistics, vol. 28, Issue 3, Sep. 2002, MIT Press, Cambridge, MA, USA, copyright Association for Computational Linguistics, p. 245-288.

Jones, "A statistical interpretation of term specificity and its application in retrieval", http://citeseer.xist.psu.edu/viewdoc/download?doi=10.1.1.115.8343&rep=rep1&type=pdf>, 2004.

Waterman, "Distributed Parse Mining", Proceedings of the NAACL HLT Workshop on Software Engineering, Testing, and Quality Assurance for Natural Language Processing, pp. 56-64, Boulder, Colorado, Jun. 2009, copyright 2009 Association for Computational Linguistics.

IBM: List of IBM Patents or Patent Applications Treated as Related (Appendix P), Dec. 10, 2018, pp. 1-2.

ANALYZING DOCUMENT CONTENT AND GENERATING AN APPENDIX

CROSS REFERENCE

The present application is a continuation of and claims priority under 35 U.S.C. § 120 of U.S. patent application Ser. No. 14/474,353, filed on Sep. 2, 2014, to U.S. patent application Ser. No. 14/101,739, filed on Dec. 10, 2013 now U.S. Pat. No. 9,916,284, which is incorporated by reference in its entirety.

FIELD

The present disclosure relates generally to the field of computer systems, and more particularly, to analyzing document content and generating an appendix.

BACKGROUND

An appendix may be referred to as a collection of useful information that is supplemental to the information that is contained in the main body of a document. The appendix may contain a table, a list, calculations, data, background information, or other types of information that may be relevant to the main document content. The information present in an appendix may support the content in the main document by enabling the reader to better understand and appreciate the topics that are contained in the. The appendix of the document is usually present at the end of the document may comprise sections, although these sections are not usually not referred to explicitly within the document, the sections of the appendix may be presented as an addendum or supplement to the main document.

Documents may be published in various forms and in various formats such as HTML, PDF and TEXT. In current practice, generally the document appendix may be manually added by researching supplemental information that the author evaluates as being potentially useful for the reader. A variety of available sources may be considered for inclusion in the appendix, depending upon the topic of the main document. For example, a financial review document about a company could include additional tabular data about the financial figures and stock performance at the end of the review. On the other hand, a scientific review of a methodology related to an experiment may contain appendix sections detailing important concepts referred to in the document.

However, the utility of the appendix may depend on several factors, such as the experience level or talent of the researcher evaluating the information for the appendix. Additionally, manually creating the appendix may consume scarce resources, such as the amount of time available to spend on the project, to fetch the information from a variety sources, such as a web page or a corpus of documents, such as encyclopedias and dictionaries. Another potential challenge to available time and resources may include the reiterative effort to edit and refine the appendix and ensure that vital information is not omitted.

BRIEF SUMMARY

Among other things, a method for analyzing document content and generating an appendix is provided. According to an embodiment of the invention, analyzing document content and generating an appendix may include: analyzing a structure of a document to identify at least one logical element in a content of a page of the document; identifying at least one relation within the identified at least one logical element to determine an appendix topic; determining a degree of relevance of the at least one relation identifying the appendix topic; extracting an appendix content from at least one source document, based on determining a relevance of the source document to the appendix topic; and formatting the appendix based on the extracted appendix content.

In another embodiment, computer program product for generating an appendix from document content may be provided. The computer program product may comprise: a computer readable storage medium readable by a processing circuit and storing instructions for execution by the processing circuit for performing a method comprising: analyzing a structure of a document to identify at least one logical element in a content of a page of the document; identifying at least one relation within the identified at least one logical element to determine an appendix topic; determining a degree of relevance of the at least one relation identifying the appendix topic; extracting an appendix content from at least one source document, based on determining a relevance of the source document to the appendix topic; and formatting the appendix based on the extracted appendix content.

In another embodiment, a computer system for generating an appendix from document content may be provided. The computer system may comprise: one or more processors, one or more computer-readable storage devices, and a plurality of program instructions stored on at least one of the one or more storage devices for execution by at least one of the one or more processors. The computer system may further comprise: a computer readable storage medium readable by a processing circuit and storing instructions for execution by the processing circuit for performing a method comprising: analyzing a structure of a document to identify at least one logical element in a content of a page of the document; identifying at least one relation within the identified at least one logical element to determine an appendix topic; determining a degree of relevance of the at least one relation identifying the appendix topic; extracting an appendix content from at least one source document, based on determining a relevance of the source document to the appendix topic; and formatting the appendix based on the extracted appendix content.

BRIEF DESCRIPTION OF THE SEVERAL VIEWS OF THE DRAWING

These and other objects, features and advantages of the present invention will become apparent from the following detailed description of illustrative embodiments thereof, which is to be read in connection with the accompanying drawings. The various features of the drawings are not to scale as the illustrations are for clarity in facilitating one skilled in the art in understanding the invention in conjunction with the detailed description. In the drawings.

DETAILED DESCRIPTION

Figure 1:
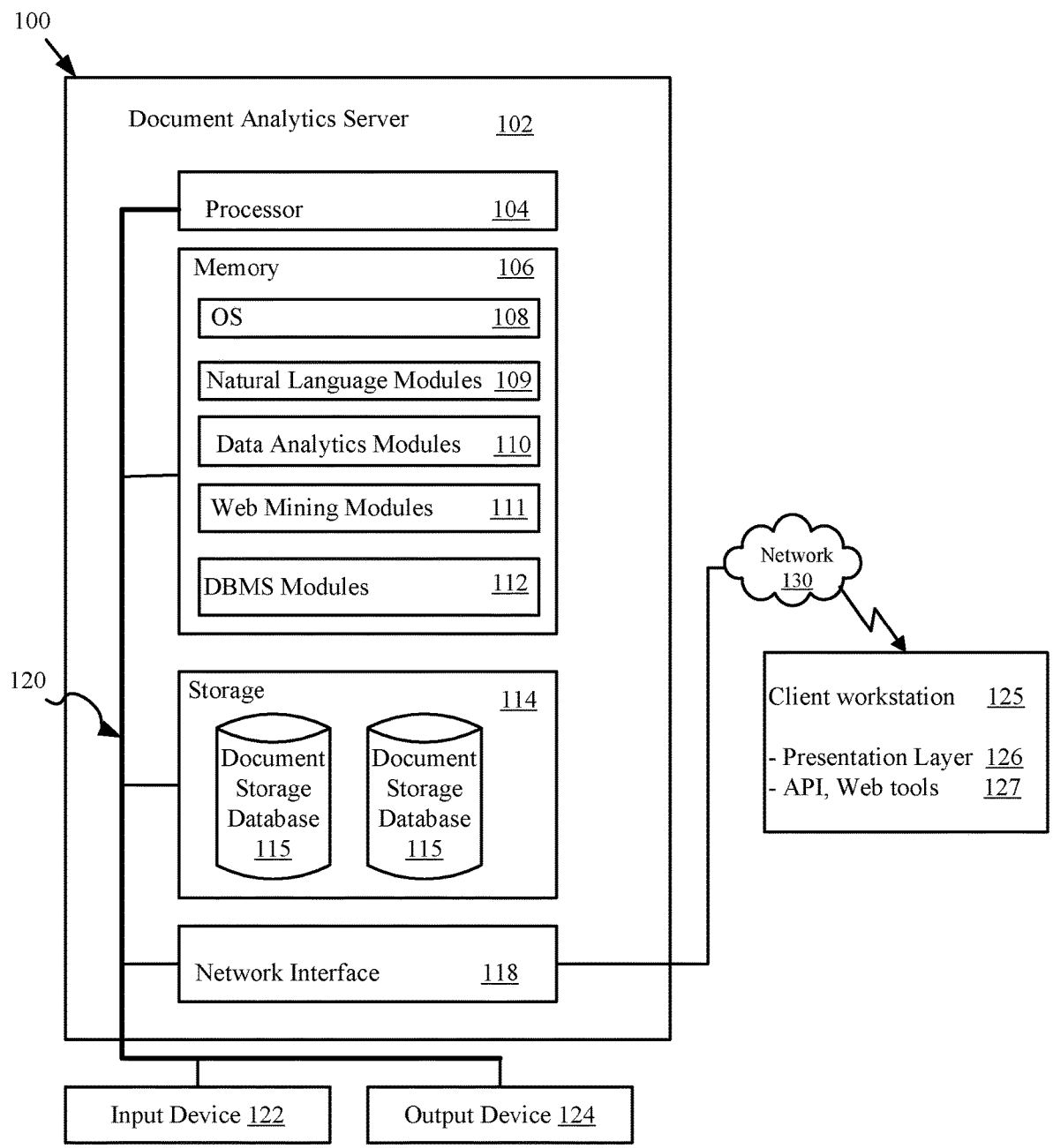
FIG. 1 is a block diagram illustrating an exemplary embodiment of a system for analyzing document content and generating an appendix.
Figure 2:
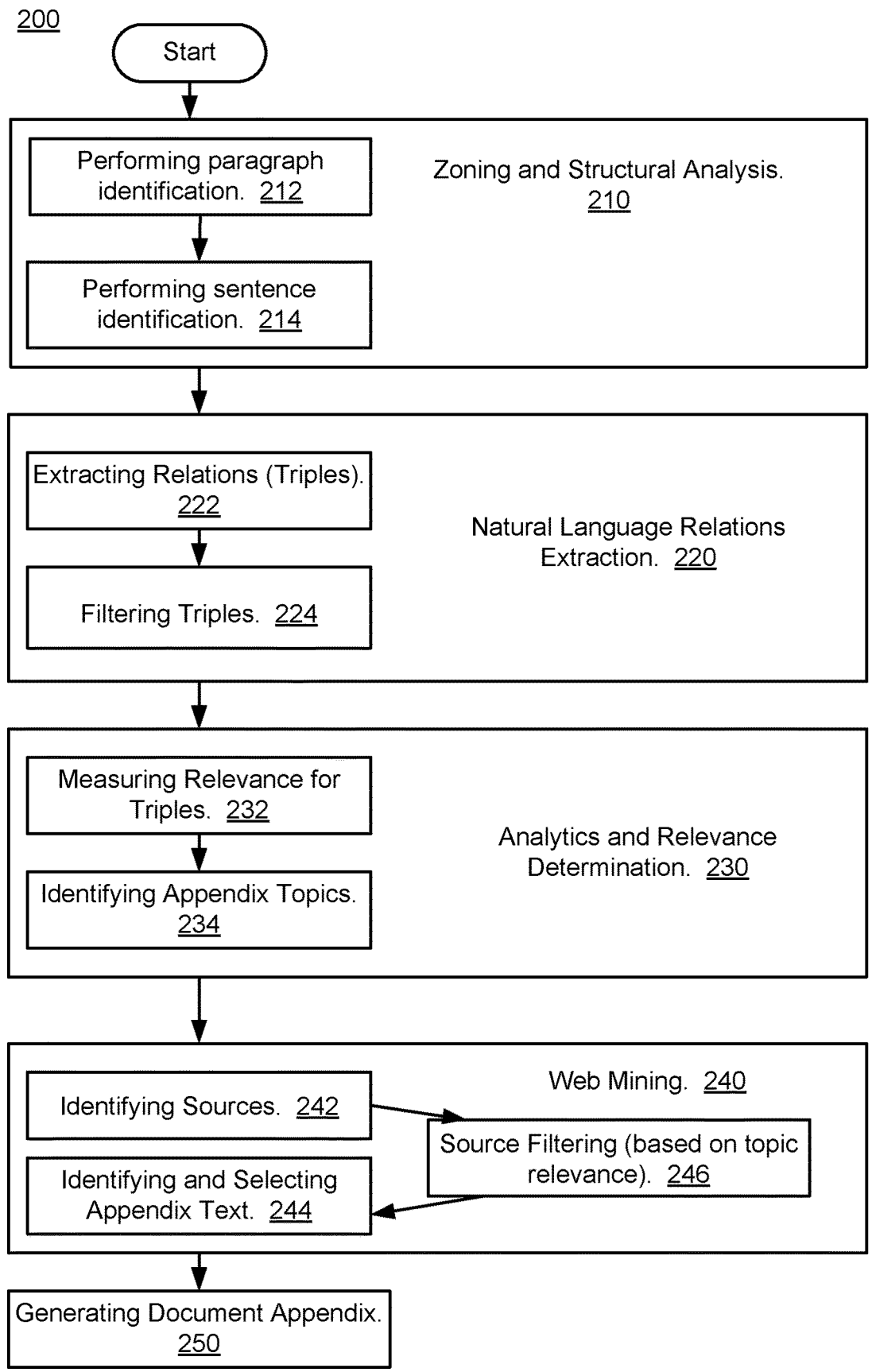
FIG. 2 is a flow diagram illustrating an overview of an exemplary embodiment of a method for analyzing document content and generating an appendix.

Embodiments of the present invention will now be described with reference to the figures. Referring to FIGS. 1-2, a Document Analytics system 100 and method 200 provide an exemplary implementation for analyzing document content and generating an appendix.

FIG. 1 is a block diagram illustrating an exemplary embodiment of a system 100 for analyzing document content and generating an appendix. The networked system 100 includes a Document Analytics Server (DA) server 102. The DA server 102 may also be connected to other computers and servers via a network 130. In general, the network 130 may be a telecommunications network and/or a wide area network (WAN). In a particular embodiment, the network 130 is the Internet.

The DA server 102 generally includes a processor 104 connected via a bus 120 to a memory 106, a network interface device 118, a storage 114, an input device 122, and an output device 124. The DA server 102 is generally under the control of an operating system 108, such as for example Linux. More generally, any operating system supporting the functions disclosed herein may be used. The processor 104 is included to be representative of a single CPU, multiple CPUs, a single CPU having multiple processing cores, and the like. Similarly, the memory 106 may be a random access memory. While the memory 106 is shown as a single identity, it should be understood that the memory 106 may comprise a plurality of modules, and that the memory 106 may exist at multiple levels, from high speed registers and caches to lower speed but larger DRAM chips. The network interface device 118 may be any type of network communications device allowing the DA server 102 to communicate with other computers via the network 130.

The storage 114 may be a persistent storage device. Although the storage 114 is shown as a single unit, the storage 114 may be a combination of fixed and/or removable storage devices, such as fixed disc drives, solid state drives, floppy disc drives, tape drives, removable memory cards or optical storage. The memory 106 and the storage 114 may be part of one virtual address space spanning multiple primary and secondary storage devices.

The input device 122 may be any device for providing input to the DA server 102. For example, a workstation configured with a keyboard and/or a mouse may be used. A DA administrator may use the input device 122 to manage the operations of the DA server 102. The output device 124 may be any device for providing output to a user of the DA server 102. For example, the output device 124 may be any conventional display screen or set of speakers. Additionally, the output device 124 may be a printer to which a user of the DA system 100 may send intermediate or finished results during the compilation of a document appendix. Although shown separately from the input device 122, the output device 124 and input device 122 may be combined. For example, a display screen with an integrated touch-screen may be used.

As shown, the memory 106 of the DA server 102 includes Natural Language Processing (NLP) modules 109 configured to identify semantic relationships within a document. The DA server 102 may also include Data Analytics modules 110 configured to statistically refine the topics to be included in the appendix. Web Mining modules 111 may be configured to search web-based repositories for additional information related to topics identified by the NLP modules 109 and Data Analytics modules 110. Database management system (DBMS) modules 112 may be configured to manage the inputs and outputs of the Document Analytic process that may be stored in one or more document storage databases 115. Exemplary inputs and outputs may include documents being analyzed, intermediate outputs from analysis by the NLP modules 109, statistical data from the Data Analytics modules 110, results gathered by the Web Mining modules 111, and the finished document with its assembled appendix. The storage 114 of the DA server 102 may also comprise other non-database 115 forms, such as file systems or optical disc. A client workstation 125 is shown communicating with the DA server 102 through a network 130. Software modules, such as Presentation Layer (graphics) modules 126 and other tools to facilitate accessing and formatting web content may be installed on the client workstation 125. The application software and operating system of the client workstation 125 may also be configured with an Application Programming Interface (API) to facilitate customizing and enhancing functionality of the client workstation 125.

The particular description in FIG. 1 is for illustrative purposes only; it should be understood that the invention is not limited to specific described embodiments, and any combination is contemplated to implement and practice the invention.

Referring now to FIG. 2, the reference numeral 200 generally designates a flow diagram of an exemplary embodiment for analyzing document content and generating an appendix. In general, processing a document comprises several major operations, each of which may decompose the original physical structure of the document into logical structures that may be further understood and processed by each of the subsequent operations. For example, 210 represents the initial phase of document decomposition, in which the document undergoes an initial zone and structural analysis, for example, to determine the arrangement of the contents of a page in terms of sentences, paragraphs, zones, and similar elements of document structure. A zone may refer to a defined area of text, and may also be referred to as a section. One skilled in the art of textual analysis may recognize that through applying techniques, such as paragraph identification (at 212), the logical elements of the document, such as chapters, paragraphs and zones (i.e., sections), and their relationship to the document, may be identified. The logical elements of the document, as identified in 212, may be further decomposed at 214 into sentences. As an example, a language corresponding to the language of the document being analyzed may be selected. Certain sets of grammatical rules, such as which words are capitalized, the set of punctuation marks, and how white space is distributed, may be applied to a paragraph to identify the sentences within the paragraph. The results of the analysis performed on the document in the major operation of 210, in particular the sentences that were identified, may be stored in one or more files in the storage 114 (FIG. 1) area of the DA server 102 (FIG. 1), or more specifically, may be stored in one or more tables of a document storage database 115 (FIG. 1) designed for this purpose. Additionally, the various rules and definitions used to logically decompose the document, such as for example, grammatical rules, punctuation rules, and dictionaries, may also be stored in the storage 114 (FIG. 1) or in tables in the database 115 (FIG. 1) on the DA server 102 (FIG. 1).

In the major operation of 220, the natural language relations extraction phase examines the basic sentences that were identified in 214, to identify the semantic relationships, or events, they contain. Using natural language processing algorithms, such as for example statistical modeling, and rules among other things, at 222 the events, also referred to as the relations or semantic relationships, within the document are identified. An event may be referred to as a relation that connects a particular subject to an object via a predicate. For example, the sentence "X acquired the image processing company Y" comprises a relation having "X" as the subject, "acquired" as the predicate, and "Y" as the object. In this context, this type of relation may be referred to as a triple. Once the relations are extracted and identified, appropriate statistical distribution measures are applied to record the positions at which a particular subject or object appears in the document. At 224, the relations (triples) are filtered. Trivial relations, such as those that do not have significant content relative to the main topic of the document (i.e., subject or object), may be eliminated from further evaluation for inclusion in the appendix. Relations that contain subjects and objects that are evenly distributed across the document also may be filtered out and eliminated, because uniformly distributed subjects and objects are likely part of the main topic. Therefore, inclusion in the appendix is not necessary. As in the major operation of 210, the results of the analysis performed on the document in the major operation of 220, such as the relations that are retained for further evaluation for inclusion in the appendix, may be stored in files in the storage 114 (FIG. 1) area of the DA server 102 (FIG. 1), or in one or more tables of a document storage database 115 (FIG. 1). Additionally, the various NLP rules and definitions used to identify the relevant relations may also be stored in the storage 114 (FIG. 1) or in tables in the database 115 (FIG. 1) on the DA server 102 (FIG. 1).

In the major operation of 230, the filtered triples undergo analytics to determine the degree of relevance and relatedness of the relations. The relations that have passed the filtering criteria in 220 now undergo further processing at 232 to detect interdependencies between the relations. For example, two relations that have the same subject but different objects may be visualized as a graph having a single node (the subject) connecting to two different nodes (the objects). In this way, a graph may be constructed around the relations that have been identified. At 234, various measures that are well-known in graph theory, such as between-ness, centrality, and connected-ness are applied to determine the candidate topics, indicated by the subjects and objects that may be included in the appendix.

The appendix topics identified in 234 may now be input to the web mining operation of 240 to generate the document appendix at 250. The application of data mining techniques to discover patterns from Web content may be referred to as web content mining. At 242, through well-known web content mining techniques, patterns may be extracted and integrated from the results retrieved from the web content mining. As in previous operations, intermediate results may be stored in one or more databases 115 (FIG. 1) or in other storage 114 (FIG. 1) on the DA server 102 (FIG. 1). In another embodiment, various other digital content, for example e-books, that is stored on the DA server 102 (FIG. 1) may also be mined for possible inclusion in the appendix. Pattern extraction may be accomplished by leveraging the characteristics of the source documents that are discovered during the web mining operation. For example, a web source such as Wikipedia, may be organized by topic, for example a person, a product, a location, with a page per topic. Through textual analysis, at 246 the content in a topic page is analyzed to calculate a measure of the relevance of the topic page to the appendix topic being searched for. Textual analysis may be considered a systematic analysis of the content of text to detect a level of relevance within the text for a topic. A statistically highly relevant topic page, may be stored on the DA server 102 (FIG. 1) as an intermediate result for further processing. Other digital sources, such as web pages, digitized books and similar digitized content, may similarly be identified, evaluated, and stored.

Various heuristics are applied at 244 to the intermediate results to extract the relevant information for inclusion in the document appendix. For example, a heuristic may define that if an appendix topic appears within a pre-determined number of paragraphs at the beginning of a page of an intermediate result, that page may be assigned a higher candidate score, based on the statistical analysis performed during 246 for inclusion in the appendix. Similarly, if an appendix topic is present as part of a tabular data and appears as the title of the tabular data, the table may be considered a good candidate for inclusion in the appendix. Other features or heuristics which may be used to identify an intermediate result for inclusion in the appendix include a length of appendix text to be generated (i.e., a number of pages), and a number of topics covered by the appendix text which match the list of topics generated (i.e., how many topics to include). Thus, at 250 the information that was extracted from various sources and analyzed for relevance to the topic of the main document may now be formatted and included as the appendix to the main document.

Figure 3:
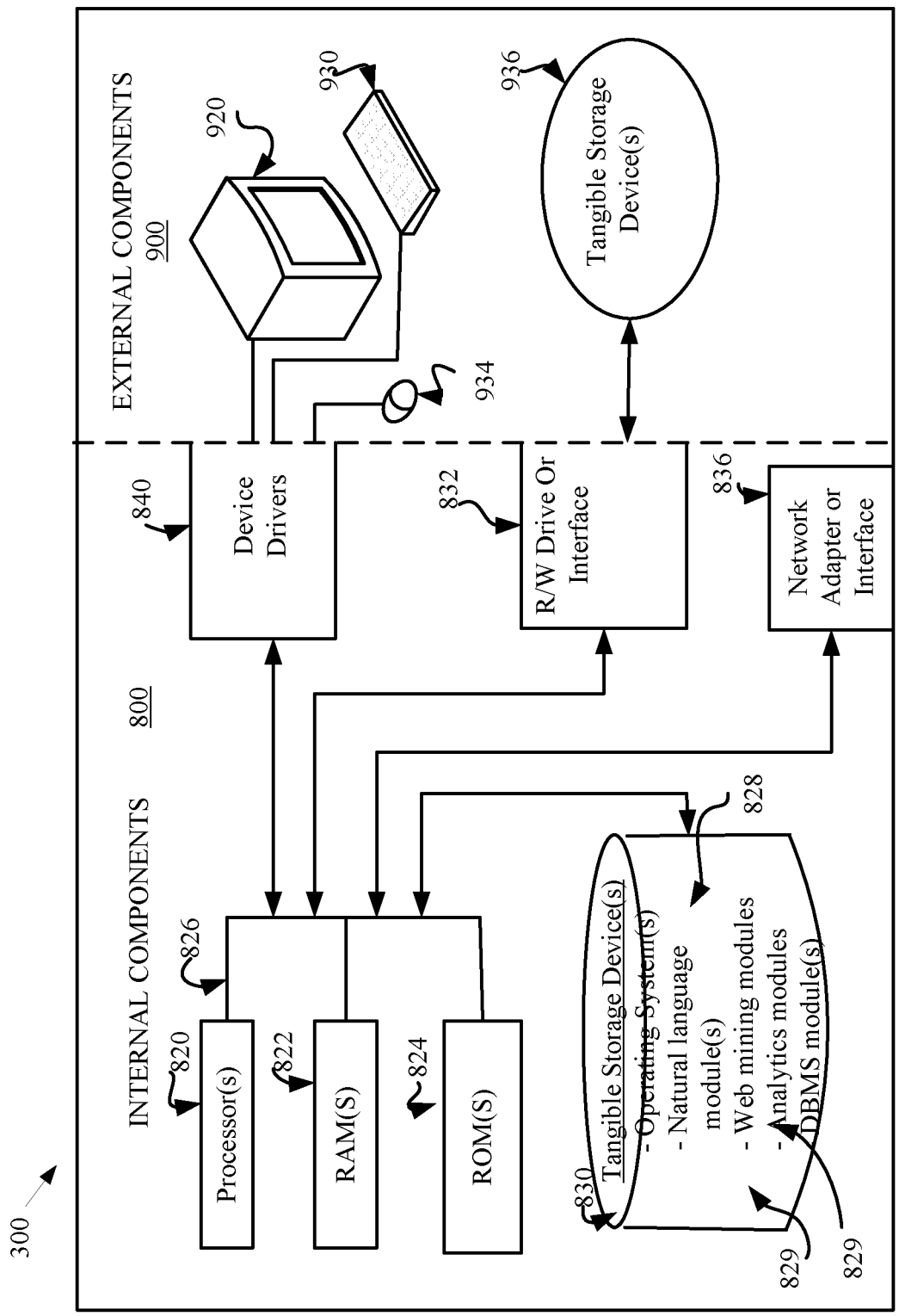
FIG. 3 is a schematic block diagram of hardware and software of the computer environment according to an embodiment of the method of FIG. 2.

Referring now to FIG. 3, computing device 300 may include respective sets of internal components 800 and external components 900 that together may provide an environment for a software application, such as a Data Analytics engine or a DBMS. Each of the sets of internal components 800 includes one or more processors 820; one or more computer-readable RAMs 822; one or more computer-readable ROMs 824 on one or more buses 826; one or more operating systems 828; one or more software applications (e.g., DA, Web mining, NLP, and DBMS modules 829) executing the method 200; and one or more computer-readable tangible storage devices 830. The one or more operating systems 828 and SAM modules 829 are stored on one or more of the respective computer-readable tangible storage devices 830 for execution by one or more of the respective processors 820 via one or more of the respective RAMs 822 (which typically include cache memory). In the embodiment illustrated in FIG. 3, each of the computer-readable tangible storage devices 830 is a magnetic disk storage device of an internal hard drive. Alternatively, each of the computer-readable tangible storage devices 830 is a semiconductor storage device such as ROM 824, EPROM, flash memory or any other computer-readable tangible storage device that can store a computer program and digital information.

Each set of internal components 800 also includes a R/W drive or interface 832 to read from and write to one or more computer-readable tangible storage devices 936 such as a CD-ROM, DVD, SSD, memory stick, magnetic tape, magnetic disk, optical disk or semiconductor storage device.

Each set of internal components 800 may also include network adapters (or switch port cards) or interfaces 836 such as a TCP/IP adapter cards, wireless WI-FI interface cards, or 3G or 4G wireless interface cards or other wired or wireless communication links. The CM modules and DBMS modules 829, and operating system 828 that are associated with computing device 300, can be downloaded to computing device 300 from an external computer (e.g., server) via a network (for example, the Internet, a local area network, or other wide area network) and respective network adapters or interfaces 836. From the network adapters (or switch port adapters) or interfaces 836 and operating system 828 associated with computing device 300 are loaded into the respective hard drive 830 and network adapter 836. The network may comprise copper wires, optical fibers, wireless transmission, routers, firewalls, switches, gateway computers and/or edge servers.

Each of the sets of external components 900 can include a computer display monitor 920, a keyboard 930, and a computer mouse 934. External components 900 can also include touch screens, virtual keyboards, touch pads, pointing devices, and other human interface devices. Each of the sets of internal components 800 also includes device drivers 840 to interface to computer display monitor 920, keyboard 930 and computer mouse 934. The device drivers 840, R/W drive or interface 832 and network adapter or interface 836 comprise hardware and software (stored in storage device 830 and/or ROM 824).

As will be appreciated by one skilled in the art, aspects of the present disclosure may be embodied as a system, method or computer program product. Accordingly, aspects of the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present disclosure may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present disclosure may be written in any combination of one or more programming languages, including an object oriented programming language such as Java, Smalltalk, C++ or the like and conventional procedural programming languages, such as the "C" programming language or similar programming languages, a scripting language such as Perl, VBS or similar languages, and/or functional languages such as Lisp and ML and logic-oriented languages such as Prolog. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present disclosure are described with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in FIGS. 1-3 illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

What is claimed is:

1. A computer system for generating an appendix from document content, the computer system comprising:
one or more computer processors, one or more computer-readable storage media, and program instructions stored on one or more of the computer-readable storage media for execution by at least one of the one or more processors capable of performing a method, the method comprising:
analyzing a document to identify a structure of the document;
in response to identifying the structure of the document, extracting semantic relationships, wherein the extracting semantic relationships further comprises:
extracting a semantic relationship from each identified sentence using example statistical modeling, wherein the semantic relationship comprises a subject, a predicate, and an object;
responsive to extracting and identifying the semantic relationship, applying statistical distribution analysis to record a position where the subject and the object appear in the document;
identifying and eliminating semantic relationships that are trivial relations, wherein trivial relations are semantic relationships that do not have content relevant to a main topic of the document, and wherein the trivial relations are at least one of:
the subject being evenly distributed within a section of the document, wherein a section is selected from a group consisting of a sentence, a paragraph, a page, and a chapter; and
the object being evenly distributed within the section of the document; and
storing a relation as a candidate appendix topic in persistent storage for further evaluation for inclusion in the appendix, wherein the relation is a semantic relationship that is either the main topic of the document or does not have a subject or an object evenly distributed in the document; and
in response to extracting semantic relationships, determining candidate appendix topics based on a degree of interdependency;
in response to determining candidate appendix topics, executing a web mining operation, wherein the web mining operation calculates a measure of relevance of the mined web page to the determined candidate appendix topics, and wherein the determining further comprises:
detecting at least one interdependency between two or morerelations stored in the persistent storage;
graphing the at least one interdependency between the two or more relations, wherein the two or more relations comprise nodes of a graph, and the at least one interdependency comprise an edge of the graph;
identifying candidate appendix topics, based on a degree of relatedness between the nodes of the graph, centrality, between-ness, and connectedness; and
storing the identified candidate appendix topics in persistent storage; and
formatting the appendix based on the mined intermediate results.

2. The computer system of claim 1, wherein the analyzing a document further comprises:
decomposing the document into logical elements;
identifying sentences within the logical elements; and
storing the identified sentences in persistent storage.

3. The computer system of claim 2, wherein the logical elements comprise:
a paragraph;
a section;
a zone; and
a chapter.

4. The computer system of claim 1, wherein the executing a web mining operation further comprises:
iteratively:
mining digital content for information corresponding to the stored candidate appendix topics;
applying textual analysis to the mined digital content to calculate the measure of relevance to the candidate appendix topics;
analyzing the mined digital content to identify at least one relevant result from the mined digital content;
storing statistically relevant mined digital content as an intermediate result in persistent storage; and
applying at least one heuristic to the stored statistically relevant result to identify a final appendix topic candidate.

5. The computer system of claim 4, wherein the at least one heuristic comprises at least one of:
the candidate appendix topic is within a pre-determined number of paragraphs from the beginning of the at least one relevant result;
the candidate appendix topic is part of a title of the at least one relevant result; and
a pre-determined number of entries in decreasing relevance from a list of relevant results.

6. A computer program product for generating an appendix from document content, the computer program product comprising:
one or more non-transitory computer-readable storage media and program instructions stored on the one or more non-transitory computer-readable storage media capable of performing a method, the method comprising:
analyzing a document to identify a structure of the document;
in response to identifying the structure of the document, extracting semantic relationships, wherein the extracting semantic relationships further comprises:
extracting a semantic relationship from each identified sentence using example statistical modeling, wherein the semantic relationship comprises a subject, a predicate, and an object;
responsive to extracting and identifying the semantic relationship, applying statistical distribution analysis to record a position where the subject and the object appear in the document;
identifying and eliminating semantic relationships that are trivial relations, wherein trivial relations are semantic relationships that do not have content relevant to a main topic of the document, and wherein the trivial relations are at least one of:
the subject being evenly distributed within a section of the document, wherein a section is selected from a group consisting of a sentence, a paragraph, a page, and a chapter;
the object being evenly distributed within the section of the document; and storing a relation as a candidate appendix topic in persistent storage for further evaluation for inclusion in the appendix, wherein the relation is a semantic relationship that is either the main topic of the document or does not have a subject or an object evenly distributed in the document; and in response to extracting semantic relationships, determining candidate appendix topics based on a degree of interdependency;

in response to determining candidate appendix topics, executing a web mining operation, wherein the web mining operation calculates a measure of relevance of the mined web page to the determined candidate appendix topics, and wherein the determining further comprises:

detecting at least one interdependency between two or morerelations stored in the persistent storage;

graphing the at least one interdependency between the two or more relations, wherein the two or more relations comprise nodes of a graph, and the at least one interdependency comprise an edge of the graph;

identifying candidate appendix topics, based on a degree of relatedness between the nodes of the graph, centrality, between-ness, and connected-ness; and storing the identified candidate appendix topics in persistent storage; and formatting the appendix based on the mined intermediate results.

7. The computer program product of claim 6, wherein the analyzing a document further comprises:

decomposing the document into logical elements;
identifying sentences within the logical elements; and
storing the identified sentences in persistent storage.

8. The computer program product of claim 7, wherein the logical elements comprise:
a paragraph;
a section;
a zone; and
a chapter.

9. The computer program product of claim 6, wherein the executing a web mining operation further comprises:
iteratively:
mining digital content for information corresponding to the stored candidate appendix topics;
applying textual analysis to the mined digital content to calculate the measure of relevance to the candidate appendix topics;
analyzing the mined digital content to identify at least one relevant result from the mined digital content;
storing statistically relevant mined digital content as an intermediate result in persistent storage; and
applying at least one heuristic to the stored statistically relevant result to identify a final appendix topic candidate.

10. The computer program product of claim 9, wherein the at least one heuristic comprises at least one of:
the candidate appendix topic is within a pre-determined number of paragraphs from the beginning of the at least one relevant result;
the candidate appendix topic is part of a title of the at least one relevant result; and
a pre-determined number of entries in decreasing relevance from a list of relevant results.

\* \* \* \* \*